Sept. 16, 1969     H. L. DOBRIKIN     3,467,830
TRAILER ELECTRICAL CIRCUITRY
Filed Dec. 8, 1966
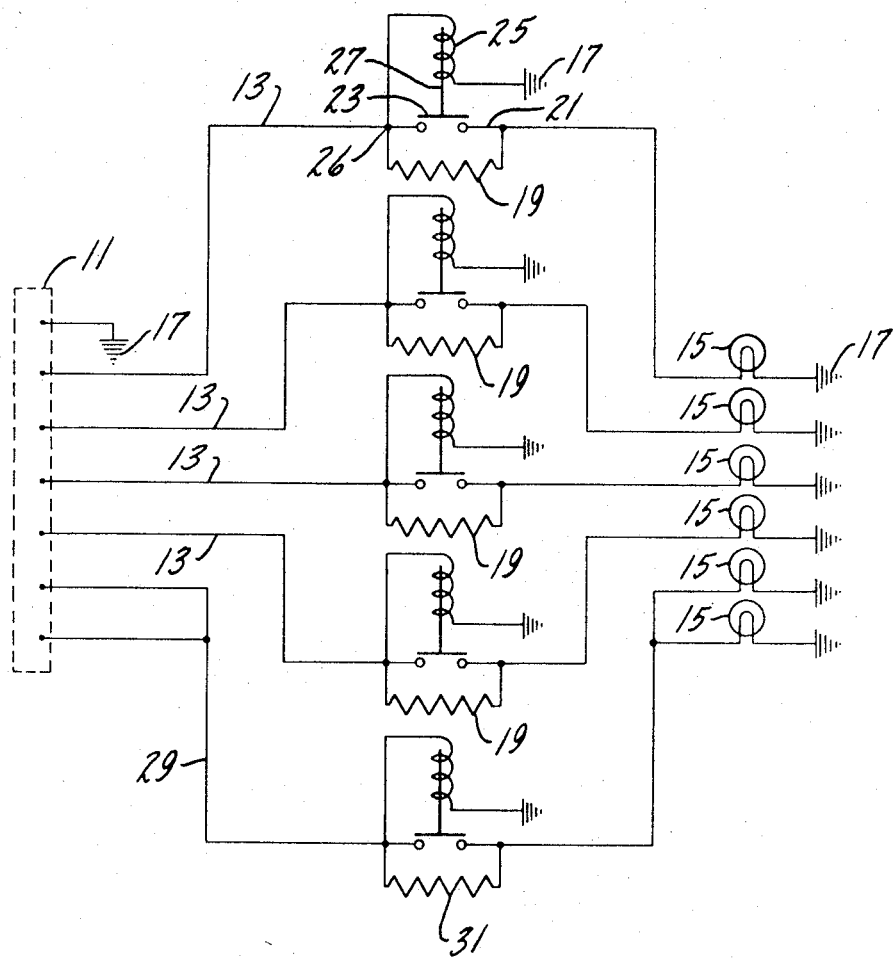
INVENTOR.
Harold L. Dobrikin,
BY Parker & Carter
Attorneys.

United States Patent Office 3,467,830
Patented Sept. 16, 1969

3,467,830
TRAILER ELECTRICAL CIRCUITRY
Harold L. Dobrikin, Highland Park, Ill., assignor to Berg Mfg. & Sales Co., Des Plaines, Ill., a corporation of Illinois
Filed Dec. 8, 1966, Ser. No. 600,075
Claims priority, application Germany, Dec. 29, 1965, B 85,189
Int. Cl. H02j 1/04
U.S. Cl. 307—10                                       3 Claims

ABSTRACT OF THE DISCLOSURE

An apparatus for protecting an electrical device against burn out due to voltage above its normal operating voltage ultilizing a resistance sufficient to reduce the higher voltage to the normal operating voltage and a bypass for said resistance having a switch which is normally closed to connect said resistance in parallel when the normal operating voltage is applied and which opens when a higher voltage is applied to connect said resistance in series with said electrical device.

---

Passenger automobiles usually have electrical systems with service voltages of either six or twelve volts, whereas automotive trucks, tractors and trailers usually have electrical systems designed for either twelve or twenty-four volt service. When a trailer is connected to a tractor, it frequently happens that this voltage difference is overlooked. If the tractor has a twelve volt system and the trailer has a twenty-four volt system, no damage will be done to the trailer, but the electrical system of the trailer will either operate inefficiently or will not operate at all. However, if the tractor has a twenty-four volt system and the trailer has a twelve volt system, the lights and other electrical devices of the trailer will burn out in a relatively short time.

An object of this invention is to prevent the burn out of electrical devices of a trailer when the electrical system of the trailer is connected to the electrical system of a tractor operating at a higher voltage. In this invenion, an automatic switch is located in each circuit leading to an electrical device, such as a light, on the trailer and the automatic switch is designed so that it will connect a resistor in series with the electrical device when the electrical system of the trailer is connected to a tractor having a voltage higher than that for which the trailer's electrical system is designed.

Another object is such an apparatus which automatically connects a resistance in series when the trailer electrical system is connected to a tractor of higher voltage, but shunts the resistance when the trailer is connected to a tractor having an electrical system of the same voltage.

Another object is to provide an automatic switch which shunts said resistance when the trailer and tractor voltages are the same, but opens said shunt when the tractor voltage exceeds the trailer voltage to connect said resistance in series with the electrical devices on the trailer.

Another object is a solenoid operated switch which solenoid is activated only when the voltage of the electrical system of the tractor is greater than the voltage of the electrical system of the trailer.

Other objects will be found in the following specification, claims and drawings.

The invention is illustrated more or less diagrammatically in the following schematic drawing of the electrical system of a trailer.

As shown in the drawing, the numeral 11 indicates a multiple plug-in contact arrangement for connection of a vehicle trailer's electrical system to the electrical system of the tractor-truck. Usually, a separate conductor 13 is provided for each electrical device 15 such as a tail light, a turn signal light, a brake light, a license plate light and so forth. Usually, the second pole of each electrical device of the trailer is connected to ground 17. The electrical devices of a trailer are generally designed to operate on a twelve volt supply.

To permit the connection of the electrical circuits 13 of the trailer, which are designed for twelve volt service, to a tractor having a twenty-four volt system, a resistor 19 is connected in each circuit. This resistor is designed with a resistance value equal to the resistance value of the electrical device 15. A bypass circuit 21 is provided in the circuit 13 in parallel with the resistance 19. A switch 23 is located in the bypass circuit and when this switch is closed, the bypass circuit and the resistor are connected in parallel with the electrical device 15. When the switch is opened, the resistor 19 is placed in series with the electrical device 15

A solenoid coil 25 is also located in each circuit 13 in parallel with the resistor 19 and the bypass circuit 21 with one side of the coil connected to ground 17. The coil is connected in the circuit 13 at 26 on the power side of the switch 23. The solenoid coil is designed to move the plunger 27 which is attached to the switch 23 only when the voltage applied to circuit 13 exceeds the designed voltage of the electrical device 15. In this case, when the voltage applied to circuit 13 exceeds twelve volts, the solenoid coil 25 is energized to move the plunger 27 and the switch 23 to break the bypass circuit 21 thereby connecting the resistor 19 in series with the electrical device 15. It is also possible to install a single solenoid actuated switch in a circuit, such as circuit 29, in which two or more electrical devices 15 are connected in parallel. In such an installation the value of the resistor 31 should be equal to the sum of the resistance values of the electrical devices 15 in that circuit.

Whereas the invention has been described for connecting a trailer having a twelve volt electrical system to a tractor having a twenty-four volt electrical system, it should also be understood that this invention could be adapted to any number of situations in which the electrical system to be supplied operates at a voltage lower or equal to the voltage of the electrical source to which it is to be connected. The only change necessary to adapt the invention to other voltages would be in the value of the resistor 19 which would always be designed so that it would reduce the voltage of the supply to the voltage of the electrical device being supplied.

I claim:
1. For use with tractor-trailer combination vehicles, an electrical system mounted entirely on the trailer and comprising a multiple-contact connector positioned on the trailer for connection with a tractor electric supply cable, a plurality of electrical energy consuming devices on the trailer, said devices being designed for operation at a predetermined voltage, conductors connecting the contacts of said connector with said devices, a switch in each said conductor, electrical means for opening said switch and connected to said conductor between said connector and said switch, a resistor connected to each conductor on opposite sides of said switch, whereby connection of the trailer with a tractor supplying said predetermined voltage automatically directs current through said conductors and switches to said devices and connection of said trailer with a tractor supplying a higher voltage automatically opens said switches and directs current through said conductors and resistors to reduce said higher voltage to said predetermined votlage.

2. The structure of claim 1 wherein said switch opening means comprises a solenoid coil connected in parallel with said switch and designed to operate at a voltage higher than said predetermined voltage to open said switch.

3. The structure of claim 1 wherein the resistance value of each of said resistors is equal to the resistance values of the electrical energy consuming devices connected to its associated conductor.

References Cited

UNITED STATES PATENTS

| | | | |
|---|---|---|---|
| 2,797,337 | 6/1957 | Hollins | 307—10 |
| 1,560,395 | 11/1925 | Monk | 317—20 X |
| 1,844,790 | 2/1932 | Norviel et al. | |
| 2,102,141 | 12/1937 | Wagar | 323—96 X |
| 2,693,539 | 11/1954 | Madigan | 307—10 |

ROBERT K. SCHAEFER, Primary Examiner

T. B. JOIKE, Assistant Examiner

U.S. Cl. X.R.

307—130; 315—77; 317—20, 31; 323—96